(12) United States Patent
Silvestri

(10) Patent No.: US 12,485,965 B1
(45) Date of Patent: Dec. 2, 2025

(54) ACTIVE WHEEL CARRIER SYSTEM AND METHOD

(71) Applicant: DANA GRAZIANO S.R.L., Turin (IT)

(72) Inventor: Marco Silvestri, Rivoli (IT)

(73) Assignee: DANA GRAZIANO S.R.L., Rivoli (IT)

(*) Notice: Subject to any disclaimer, the term of this patent is extended or adjusted under 35 U.S.C. 154(b) by 0 days.

(21) Appl. No.: 19/000,268

(22) Filed: Dec. 23, 2024

(51) Int. Cl.
*B62D 17/00* (2006.01)
*B62D 7/18* (2006.01)

(52) U.S. Cl.
CPC .......... *B62D 17/00* (2013.01); *B62D 7/18* (2013.01); *B60G 2200/46* (2013.01); *B60G 2200/4622* (2013.01)

(58) Field of Classification Search
CPC ........ B62D 17/00; B62D 5/0418; B62D 7/18; B60G 2200/46; B60G 2200/462; B60G 2200/4622; B60G 2202/42; B60G 2206/50; B60G 2204/4193; B60G 2204/62; B60G 2204/418
USPC ....... 280/86.75, 86.751, 86.758, 5.52, 5.521, 280/5.522
See application file for complete search history.

(56) References Cited

U.S. PATENT DOCUMENTS

| | | |
|---|---|---|
| 8,313,110 B2 | 11/2012 | Meitinger et al. |
| 10,351,173 B2 | 7/2019 | Schmid et al. |
| 10,668,950 B2 | 6/2020 | Kurita et al. |
| 11,014,608 B2 * | 5/2021 | Quatrano ........... B60G 17/0162 |
| 11,097,768 B2 | 8/2021 | Ooba et al. |
| 2003/0011157 A1 * | 1/2003 | Aubarede ............. B60G 7/008 280/86.751 |

FOREIGN PATENT DOCUMENTS

| | | | |
|---|---|---|---|
| DE | 3928135 A1 * | 3/1990 | |
| DE | 102015113153 A1 | 2/2017 | |
| EP | 2212129 B1 | 11/2013 | |
| WO | 98016418 A1 | 4/1998 | |

OTHER PUBLICATIONS

Duff, M., "Lamborghini Developing Active Camber and Toe Control to Improve Handling," Car and Driver, Available Online at https://www.caranddriver.com/news/a46132454/lamborghini-active-wheel-carrier-revealed/, Dec. 15, 2023, 11 pages.
Wakeham, K., "Everyone got how this works wrong—Lamborghini Active Wheel Carrier ACTUALLY explained," YouTube Website, Available Online at https://www.youtube.com/watch?app=desktop &v=UN71i7RVaXl, Feb. 19, 2024, 2 pages.

* cited by examiner

*Primary Examiner* — Keith J Frisby
(74) *Attorney, Agent, or Firm* — McCoy Russell LLP

(57) ABSTRACT

An active wheel carrier system and method are provided. The active wheel carrier system includes, in one example, a constant velocity (CV) joint, a wheel hub coupled to the CV joint and including a set of hub bearings, a hub carrier inner race coupled to the set of bearings, a hub carrier outer race, multiple roller elements interposed between the hub carrier inner race and the hub carrier outer race, a control swivel coupled to the hub carrier inner race, a camber-angle drive configured to independently rotate the hub carrier inner race about a first axis, and a toe-angle drive configured to independently rotate the hub carrier inner race about a second axis that is distinct from the first axis.

20 Claims, 7 Drawing Sheets

ACTIVE WHEEL CARRIER SYSTEM AND METHOD

TECHNICAL FIELD

The present description relates generally to an active wheel carrier system that is configured to independently adjust camber angle and toe angle.

BACKGROUND AND SUMMARY

In vehicles the capacity to manage and increase the vehicle dynamics is relevant to increase handling performance. Attempts have been made to cooperatively control camber and toe angle of vehicle wheels. DE 102015113153 A1 discloses an active wheel carrier that simultaneously adjusts the camber angle and the toe angle of a vehicle wheel. In the active wheel carrier system two cylinders are connected to one another by a sloped face and the cylinders are jointly controlled via rotation. To elaborate, the combined rotation of the two connected cylinders allows the system to alter the two angles at the same time. Therefore, in the active wheel carrier device disclosed in DE 102015113153 A1, both cylinders need to be adjusted to alter the camber angle and the toe angle. Therefore, the active wheel carrier device disclosed in DE 102015113153 A1 is not capable of independently adjusting the camber angle or the toe angle.

The inventors have recognized several issues with the active wheel carrier disclosed in DE 102015113153 A1 and other previous active wheel carriers. Simultaneously managing toe and camber angle constrains the active wheel carrier's adjustability and handling performance gains, as a result. Further, previous active wheel carriers have exhibited space inefficiencies thereby inhibiting the carrier's integration into certain vehicle platforms or demanding a significant redesign of the surrounding vehicle system.

The inventors have recognized the abovementioned challenges and developed an active wheel carrier system to overcome at least a portion of the challenges. The active wheel carrier system includes, in one example, a constant velocity (CV) joint and a wheel hub that is coupled to the CV joint and includes a set of hub bearings. The active wheel carrier system further includes a hub carrier inner race coupled to the set of bearings, a hub carrier outer race, and multiple roller elements interposed between the hub carrier inner race and the hub carrier outer race. The active wheel carrier system further includes a control swivel coupled to the hub carrier inner race, a camber-angle drive configured to independently rotate the hub carrier inner race about a first axis, and a toe-angle drive configured to independently rotate the hub carrier inner race about a second axis that is distinct from the first axis. In this way, the active wheel carrier system achieves increased space efficiency and facilitates handling performance gains in the vehicle in which it is integrated.

In one example, the camber-angle drive may be a camber-angle worm drive that includes a camber-angle worm screw that is threadingly engaged with a camber-angle worm gear that is coupled to the control swivel and a camber-angle actuator that is configured to rotate the camber-angle worm screw. Further in such an example, the toe-angle drive may be a toe-angle worm drive that includes a toe-angle worm screw that is threadingly engaged with a toe-angle worm gear that is coupled to the control swivel and a toe-angle actuator that is configured to rotate the toe-angle worm screw. Using worm drives for camber angle and toe angle adjustment allows the drives to hold the system in desired angular position without experiencing back-drive, thereby avoiding persistent actuator input once the drives have reached a desired angular position with regard to camber angle or toe angle.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

An active wheel carrier system and method are descried herein that are designed to actively and independently manage wheel camber and toe angles during wheel motion through the use of an external constant velocity (CV) joint and a wheel hub assembly. To achieve the active and independent management of camber angle and toe angle, a wheel carrier is incorporated inside an external CV joint. This external CV joint is formed by a hub carrier outer race, a hub carrier inner race, and a series of roller elements (e.g., spherical balls) that are arranged between the inner race and the outer race. To independently manage the relative motion (and therefore the camber and toe angles) between hub carrier inner and outer races, there is a control swivel connected to the inner race of the hub carrier and guided by a slot in the hub carrier outer race, for example. In one example, camber angle is permitted by swivel tilting through the hub carrier outer race slot. Further, in such an example, toe angle is permitted by swivel rotation around its own axis. The control swivel may be independently tilted and rotated via distinct worm drives, in one example. In such an example, each worm drive may be formed by a worm gear and a worm screw that is actuated by a dedicated actuator. However, other kind of gears, drive, or actuation systems may be used to independently move the control swivel with the two degrees of freedom.

Figure 1:
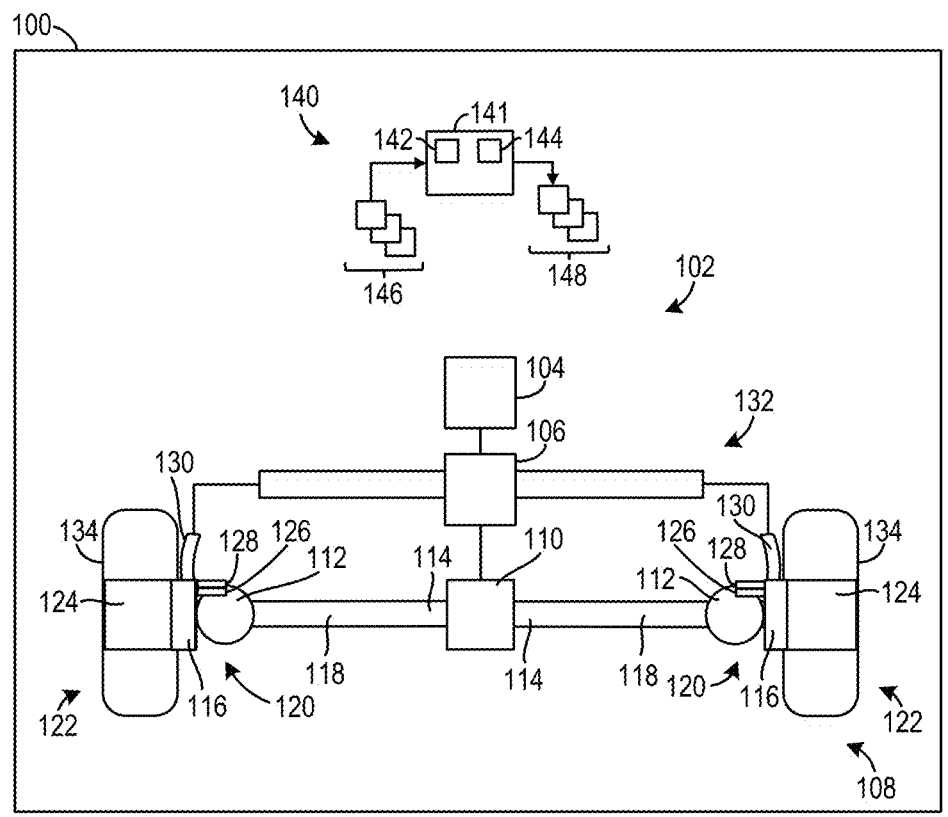
FIG. 1 shows a schematic representation of a vehicle with active wheel carrier assemblies that include wheel hubs.
Figure 1:
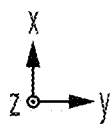
Figure 2:
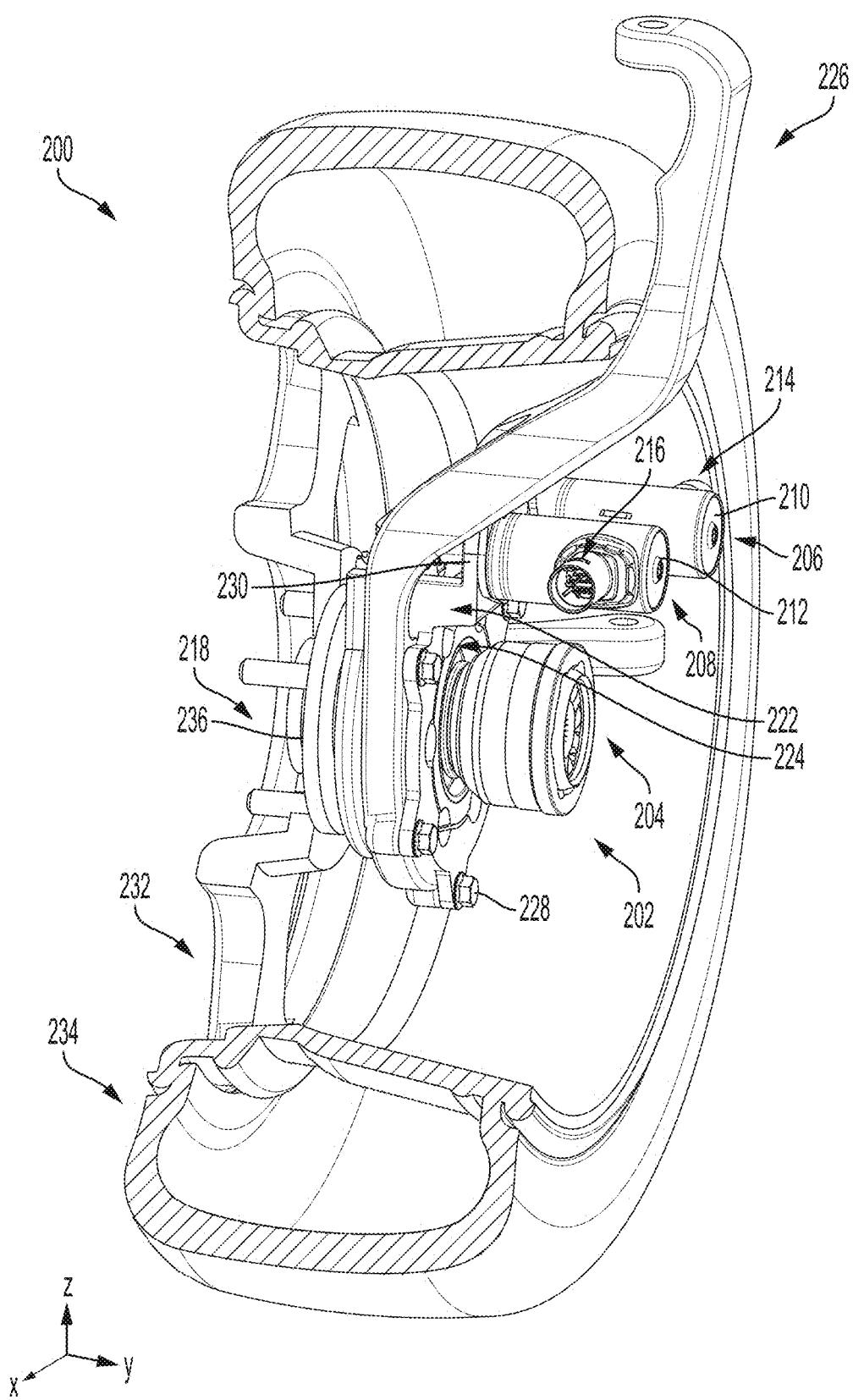
FIGS. 2-6 show an example of a wheel assembly with an active wheel carrier system.

FIG. 1 schematically illustrates a vehicle 100 with a powertrain 102. The vehicle 100 may take the form of an electric vehicle (EV) (e.g., a hybrid electric vehicle or an all-electric vehicle) or an internal combustion engine (ICE) vehicle, in different examples. Further, the vehicle 100 may take a variety of forms in different examples, such as a light, medium, or heavy duty vehicle.

The powertrain 102 includes a prime mover 104 (e.g., a traction motor and/or an ICE). The powertrain 102 may further include a transmission 106 that is rotationally coupled to the prime mover 104.

The transmission 106 is rotationally coupled to an axle 108, in the illustrated example. As such, the axle is a drive axle in the illustrated example. The axle 108 may include a differential 110. The differential 110 is rotationally coupled to CV joints 112 (e.g., inner CV joints) via shafts 114. Further, inner CV joints 112 are rotationally coupled to outer CV joints 116 in active wheel carrier systems 120 that may be conceptually included in wheel assemblies 122. The outer CV joints 116 are schematically depicted in the example illustrated in FIG. 1. However, it will be understood that the outer CV joints have greater structural complexity that is expanded upon herein.

The outer CV joints 116 are rotationally coupled to wheel hubs 124 that are also included in the active wheel carrier systems 120. The active wheel carrier systems 120 each further include a camber-angle drive 126 and a toe angle drive 128. Steering knuckles 130 may be coupled to the wheel hubs 124. The steering knuckles 130 may be conceptually included in the active wheel carrier systems 120 and/or a steering system 132 that may include tie rods, cylinders, and the like that are configured to move the steering knuckles. Wheels 134 are rotationally coupled to the wheel hubs 124. The active wheel carrier systems 120 have additional complexity that is expanded upon herein with regard to FIGS. 2-12.

The vehicle 100 may also include a control system 140 with a controller 141. The controller 141 may include a processor 142 and memory 144. The memory may hold instructions stored therein that when executed by the processor cause the controller 141 to perform various methods, control techniques, and the like discussed herein. The processor 142 may include a microprocessor unit and/or other types of circuits. The memory 144 may include known data storage mediums such as random access memory, read only memory, keep alive memory, combinations thereof, and the like. The controller 141 may receive various signals from sensors 146 positioned in different locations in the vehicle. The controller 141 may also send control signals to various actuators 148 that are positioned at different locations in the vehicle 100. For instance, the controller 141 may send command signals to the active wheel carrier systems 120 and, in response, camber angle and the toe angle may be independently adjusted when the vehicle is in motion. It will be understood that the controllable components in the vehicle described herein may include actuators. The other controllable components in the vehicle may be operated in a similar manner with regard to sensor signals and actuator adjustment.

An axis system is provided in FIG. 1 as well as FIGS. 2-12, when appropriate, for reference. The z-axis may be a vertical axis (e.g., parallel to a gravitational axis), the x-axis may be a longitudinal axis (e.g., horizontal axis), and/or the y-axis may be a lateral axis, in one example. However, the axes may have other orientations, in other examples.

FIGS. 2-6 show an example of a wheel assembly 200 with an active wheel carrier system 202. The active wheel carrier system 202 includes a CV joint 204 (e.g., an inner CV joint) as well as a toe-angle drive 206 and a camber-angle drive 208. The toe-angle drive 206 is configured to independently adjust a toe angle 250 of the wheel assembly 200 (in relation to a camber angle 252), shown specifically in FIG. 4. Conversely, the camber-angle drive 208 is configured to independently adjust the camber angle 252 of the wheel assembly 200 (in relation to a toe angle 250). It will be understood that the toe angle 250 is an angle measured about an axis 254 and the camber angle 252 is an angle measured about an axis 256.

The toe-angle drive 206 includes an electric motor 210 and the camber-angle drive 208 includes an electric motor 212, in the illustrated example. The electric motor 210 includes an electrical interface 214 and the electric motor 212 also includes an electrical interface 216. These electric interfaces are electrically coupled to a controller and therefore may receive control signals therefrom in the illustrated example. However, other forms of actuation for these drives have been contemplated.

The active wheel carrier system 202 shown in FIGS. 2-6 further includes a wheel hub 218 that is rotationally coupled to the CV joint 204. The active wheel carrier system 202 further includes a hub carrier 220 that functions as a joint (e.g., a CV joint which may be referred to as an outer CV joint). The hub carrier 220 includes an outer race 222 and an inner race 224. A steering knuckle 226 may be coupled to the outer race 222. Attachment device 228 (e.g., bolts, screws, pins, combinations thereof, and the like) may specifically be used to removably attach the steering knuckle 226 to the outer race 222, in one example. The outer race 222 may include a section 230 with the electric motor 212 of the camber-angle drive 208 mounted thereto. The section 230 therefore may circumferentially surround a worm screw 244 that is discussed in greater detail herein.

The wheel assembly 200 includes a rim 232 and a tire 234 mounted thereto, in the illustrated example. Further, the rim 232 is removably attached to a flange 236 of the wheel hub 218.

Figure 3:
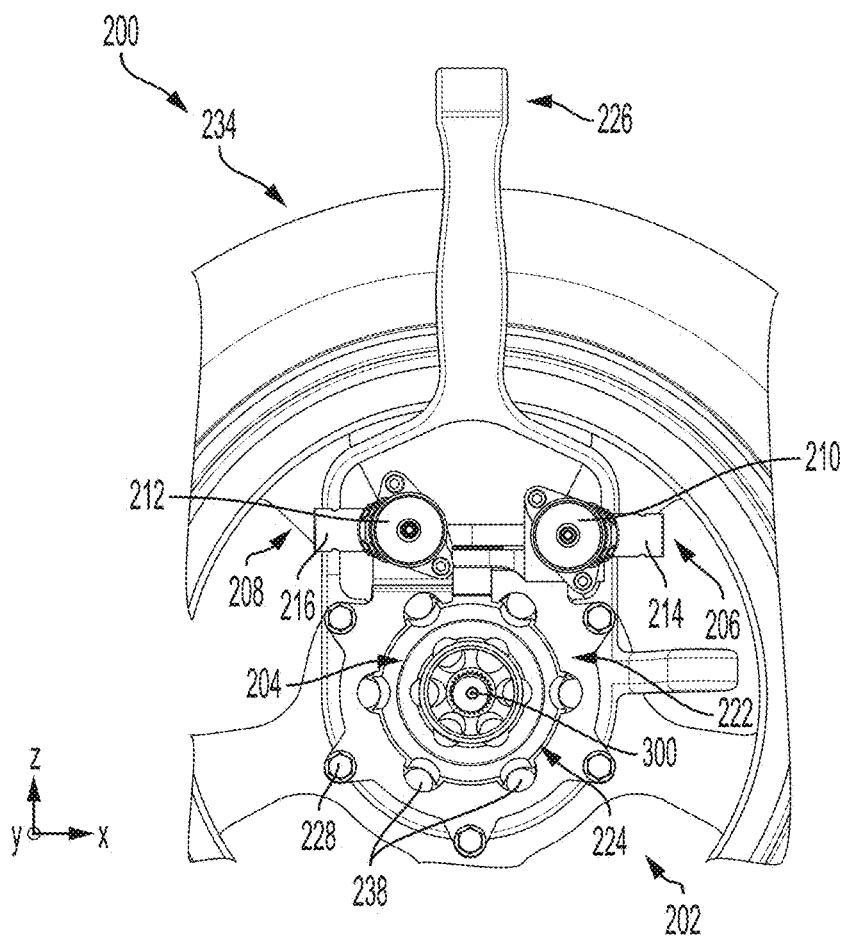
Figure 4:
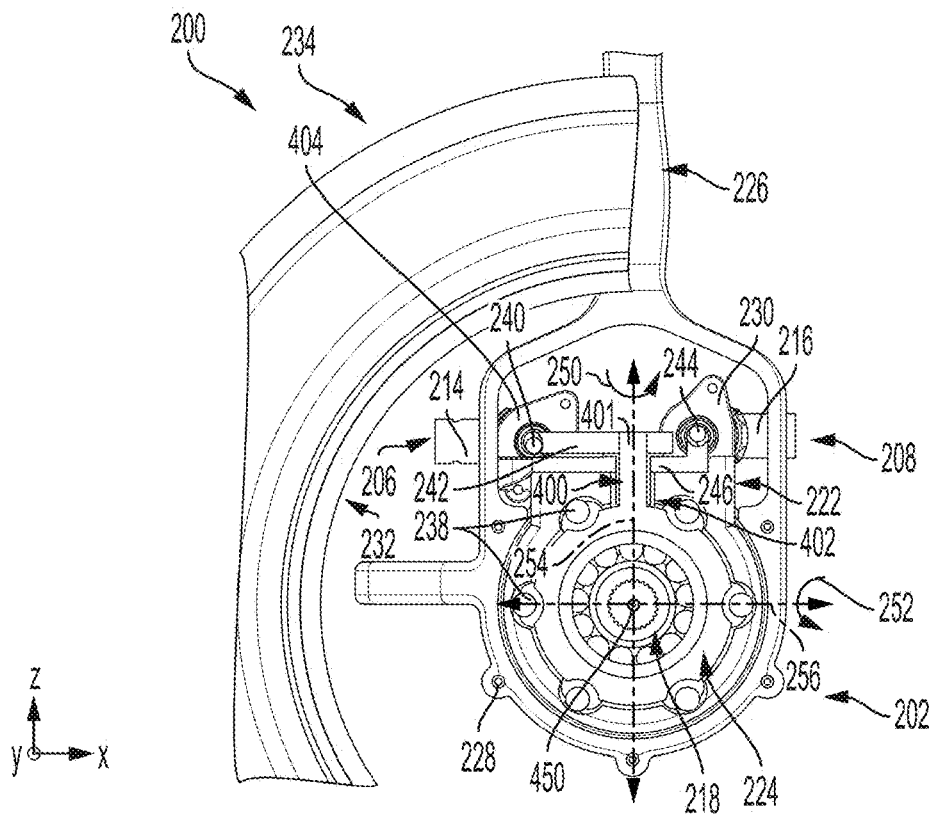
Figure 5:
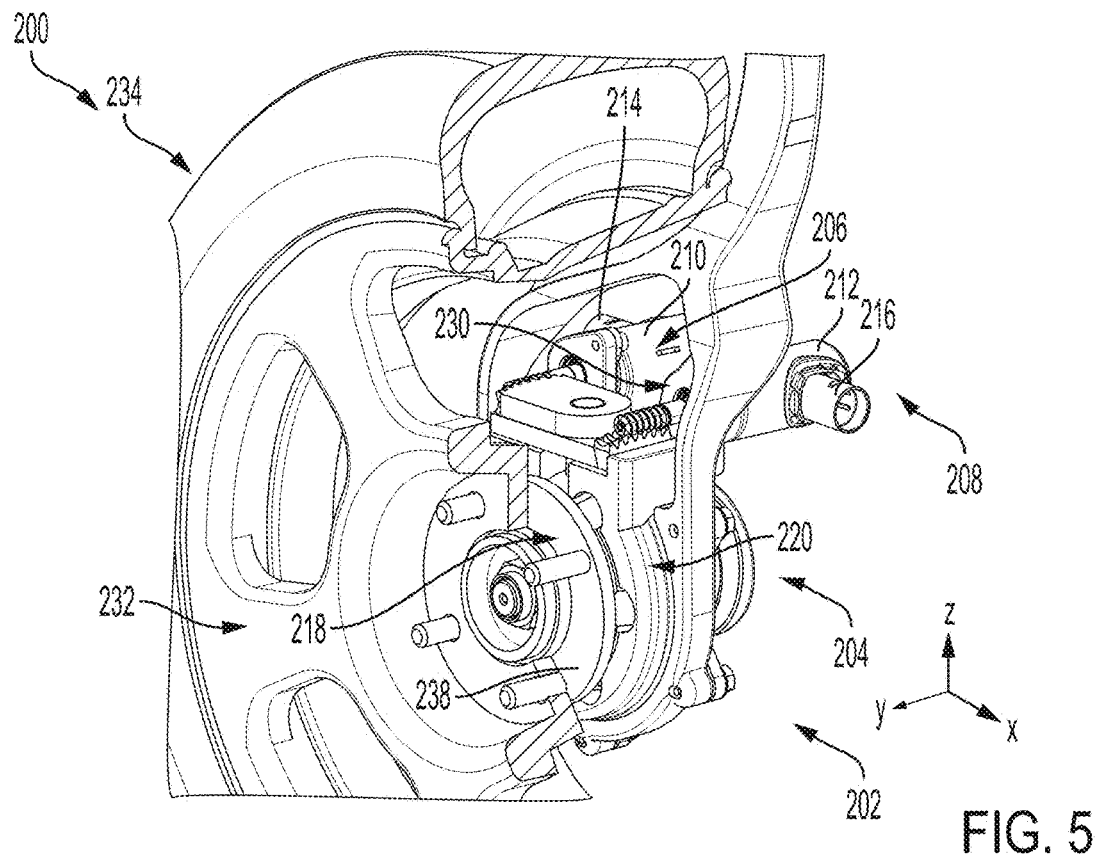

As depicted in FIGS. 3-4, roller elements 238 (e.g., spherical balls) are arranged between the inner race 224 and the outer race 222 in the hub carrier 220. The roller elements 238 in the hub carrier 220 allow the hub carrier to conceptually function as an external CV joint and may be referred to as such. A rotational axis 300 of an input of the CV joint 204 is provided in FIG. 3 for reference.

FIG. 4 shows various components of the toe-angle drive 206 and the camber-angle drive 208. To elaborate, the toe-angle drive 206 includes a toe-angle worm screw 240 that is threadingly engaged with a toe-angle worm gear 242. The motor in the toe-angle drive 206 is coupled to the worm screw 240 for rotation. It will be understood, that the toe angle gear 242 cannot back drive the worm screw 240. In this way, the active wheel carrier system 202 is able to set a desired toe-angle and avoid rotational input for holding the wheel assembly 200 at the target toe angle. The camber-angle drive 208 includes the camber-angle worm screw 244 that is threadingly engaged with a camber-angle worm gear 246. The motor in the camber-angle drive 208 is coupled to the worm screw 244 for rotation. It will be understood, that the camber-angle worm gear 246 cannot back drive the worm screw 244. In this way, the active wheel carrier system 202 is able to set a desired camber-angle and avoid rotational input for holding the wheel assembly 200 at the target camber angle. Thus the toe-angle drive 206 and the camber-angle drive 208 are irreversible worm drives, in the illustrated example. However, other suitable types of toe-angle and camber-angle drives may be used in other embodiments.

FIG. 4 further depicts a control swivel 400 that includes a shaft 401 which is coupled to the inner race 224. It will be understood that the control swivel 400 is included in the active wheel carrier system 202. The outer race 222 includes a slot 402 that allows the shaft 401 to extend through the outer race and enable the camber angle 252 to be adjusted via the active wheel carrier system 202 and specifically the camber-angle drive 208. The toe angle gear 242 is positioned vertically above the camber-angle worm gear 246 in the illustrated example. Further, the toc-angle worm gear 242 is configured to be rotated about a rotational axis of the shaft 401 independent of the camber-angle worm gear 246. In the illustrated example, the camber-angle worm gear 246 includes a section 404 that allows the motor in the toe-angle drive 206 to be mounted thereto. The section 404 vertically extends from a base of the camber-angle worm gear 246, in the illustrated example. A rotational axis 450 of the wheel hub 218 is provided in FIG. 4 for reference.

Figure 6:
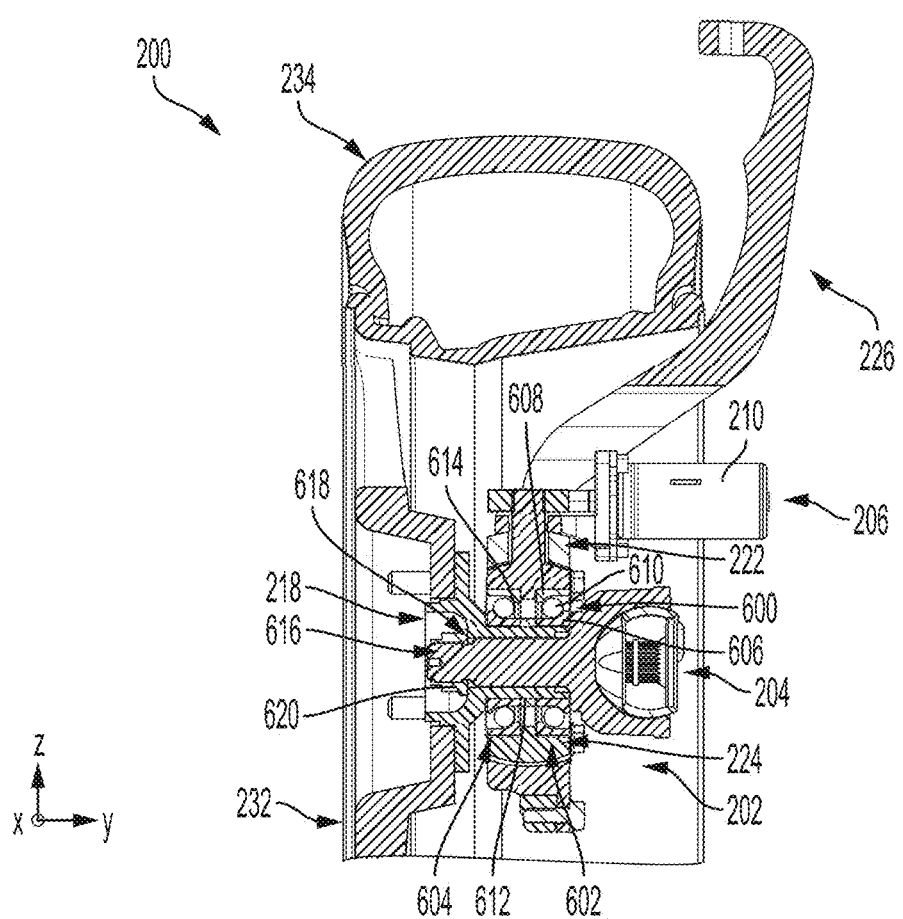

FIG. 6 shows a set of bearings 600 that includes an inner bearing 602 and an outer bearing 604. Each of the bearings 602 and 604 includes an inner race 606, an outer race 608, and spherical balls 610 that are positioned between the races. Further, in the illustrated example, the inner races 606 are coupled to an outer surface 612 of the wheel hub 218 and the outer races 608 are coupled to an inner surface 614 of the hub carrier inner race 224.

In the example depicted in FIG. 6, the CV joint 204 includes a shaft 616 that mates with an opening 618 in the hub carrier 220. Further, a nut 620 threads onto the shaft 616, in the illustrated example.

Figure 7:
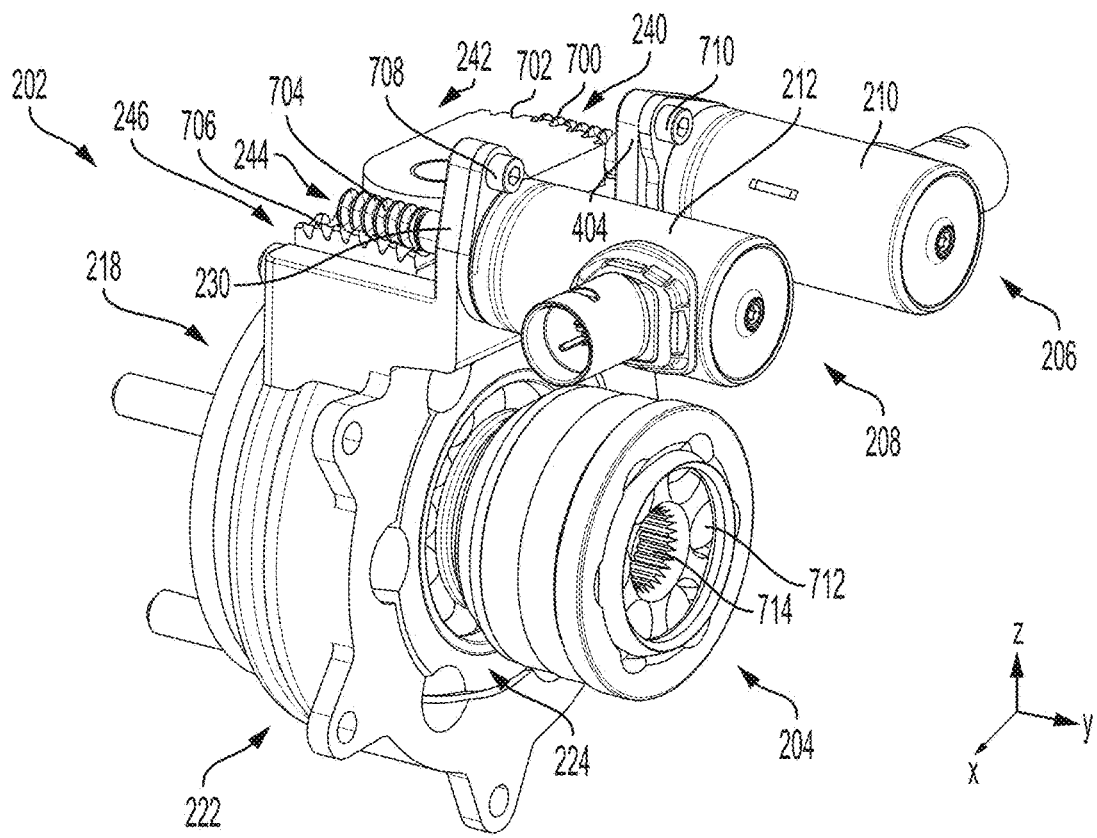
FIGS. 7-8 show different perspective views of the active wheel carrier system shown in FIGS. 2-6.
Figure 8:
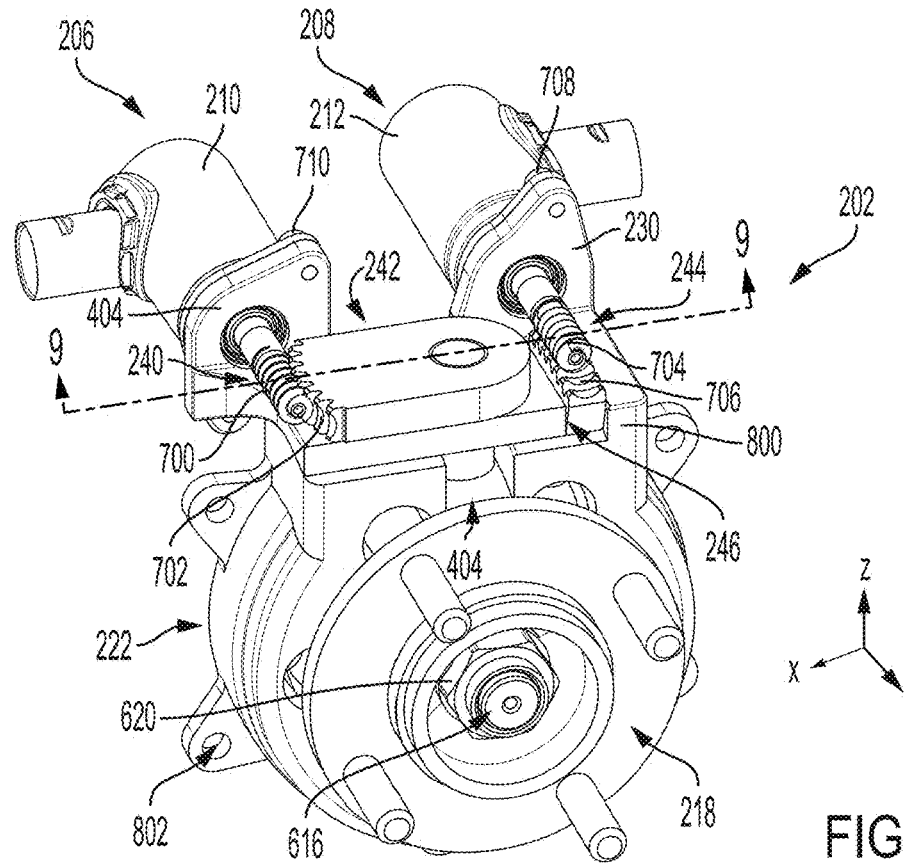

FIGS. 7-8 show detailed perspective views of the active wheel carrier system 202 with the toe-angle drive 206 and the camber-angle drive 208. The electric motor 210, the worm screw 240, and the toe-angle worm gear 242 in the toe-angle drive 206 are again depicted. Additionally, the electric motor 212, the worm screw 244, and the camber-angle worm gear 246 in the camber-angle drive 208 are again depicted. Threads 700 in the worm screw 240 that engage threads 702 in the toe-angle worm gear 242 are depicted in FIGS. 7-8. Threads 704 in the worm screw 244 that engage threads 706 in the camber-angle worm gear 246 are depicted in FIGS. 7-8.

Attachment devices 708 may be used to mount the motor 212 to the section 230 of the outer race 222. Similarly, attachment devices 710 may be used to mount the motor 210 to the section 404 of the camber-angle worm gear 246.

FIG. 7 specifically depicts the CV joint 204 and the inner race 224. The CV joint 204 includes roller elements 712 and splines 714 that allow the joint to be rotationally coupled to upstream components (e.g., a shaft). The wheel hub 218 is further shown in FIG. 7.

FIG. 8 again shows the wheel hub 218 and the nut 620 that thread onto the CV joint shaft 616. The camber-angle worm gear 246 may abut a step 800 in the outer race 222, in one example. Additionally, the outer race 222 may include openings 802 that allow the race to be mounted within the vehicle system. The slot 402 in the outer race 222 is also depicted in FIG. 8. A viewing plane 9-9 corresponding to the cross-sectional view depicted in FIG. 9 is provided in FIG. 8.

Figure 9:
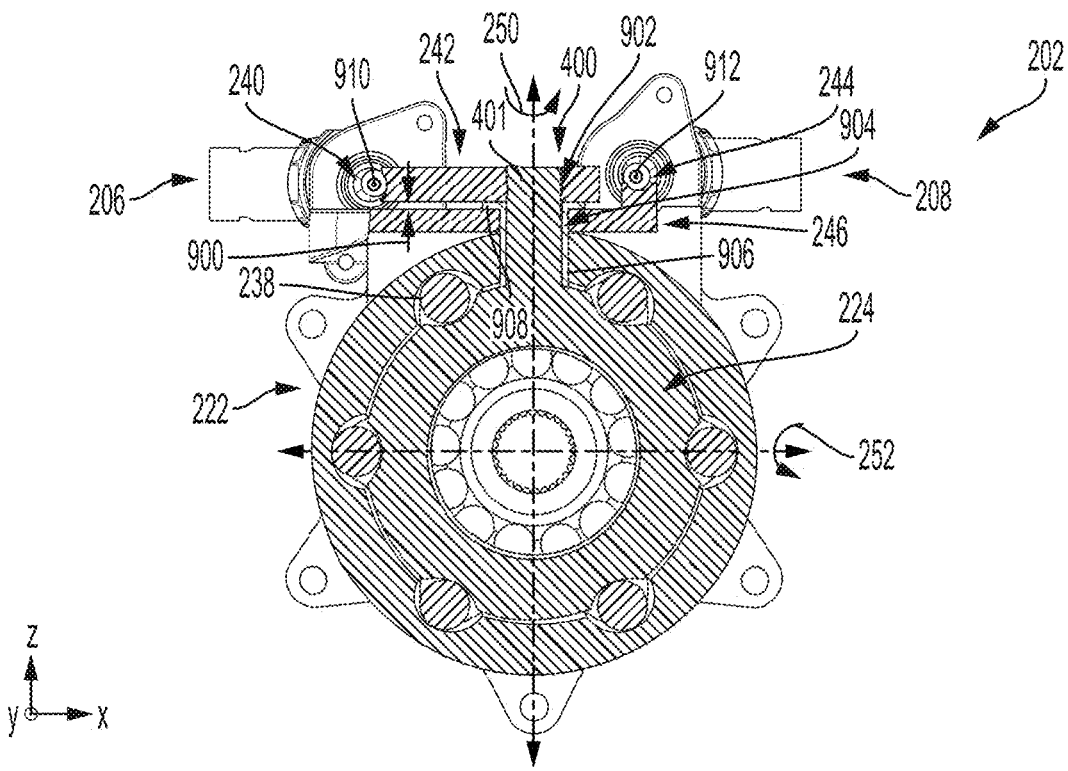
FIG. 9 shows a cross-sectional view of the active wheel carrier system shown in FIGS. 2-6.

FIG. 9 shows the active wheel carrier system 202 in cross-section. The control swivel 400 with the shaft 401 are depicted in FIG. 9. The shaft 401 is coupled to the inner race 224 such that independent inputs from the toe-angle drive 206 and the camber-angle drive 208 are able to alter the toe angle 250 and the camber angle 252 of the wheel assembly 200, shown in FIG. 8. FIG. 9 again shows the roller elements 238 (e.g., spherical balls) between the inner race 224 and the outer race 222. The toe-angle worm gear 242 and the camber-angle worm gear 246 are again depicted. The toc-angle worm gear 242 is positioned above the camber-angle worm gear 246 with a gap 900 therebetween.

The control swivel shaft 401 extends through an opening 902 in the toe-angle worm gear 242 and an opening 904 in the camber-angle worm gear 246, in the illustrated example. The control swivel shaft 401 may mate with a sleeve 906 that mates with the opening 904 in the camber-angle worm gear 246. A flange 908 of the sleeve 906 may span the gap 900 between the toe-angle worm gear 242 and the camber-angle worm gear 246.

FIG. 9 illustrate a rotational axis 910 of the worm screw 240 and a rotational axis 912 of the worm screw 244. The axes 910 and 912 are parallel to one another in the example of the active wheel carrier system 202 depicted in FIG. 9. In this way, the system is able to achieve greater space efficiency, if desired.

Figure 10:
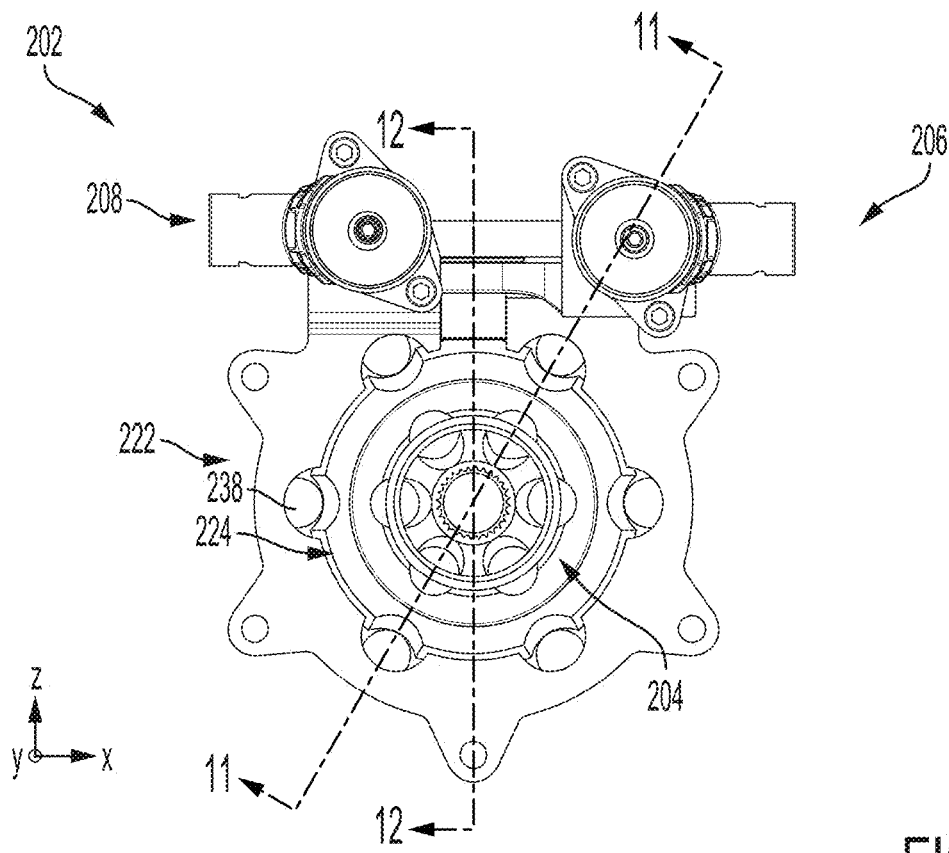
FIG. 10 shows a side view of the active wheel carrier system shown in FIGS. 2-6.

FIG. 10 shows a side view of the active wheel carrier system 202. The toe-angle drive 206, the camber-angle drive 208, the outer race 222, the inner race 224, the roller elements 238, and the CV joint 204 are again depicted in FIG. 10.

Figure 11:
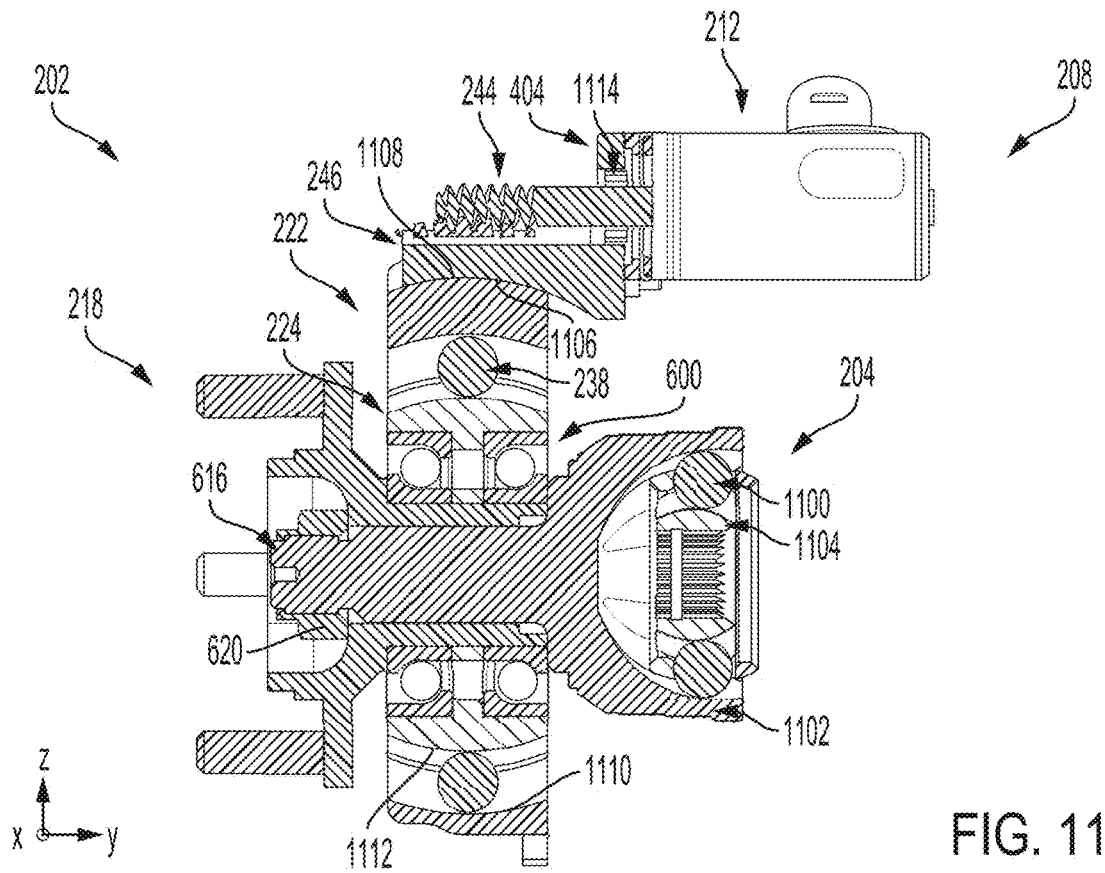
FIGS. 11-12 show cross-sectional views of the active wheel carrier system depicted in FIG. 10.
Figure 12:
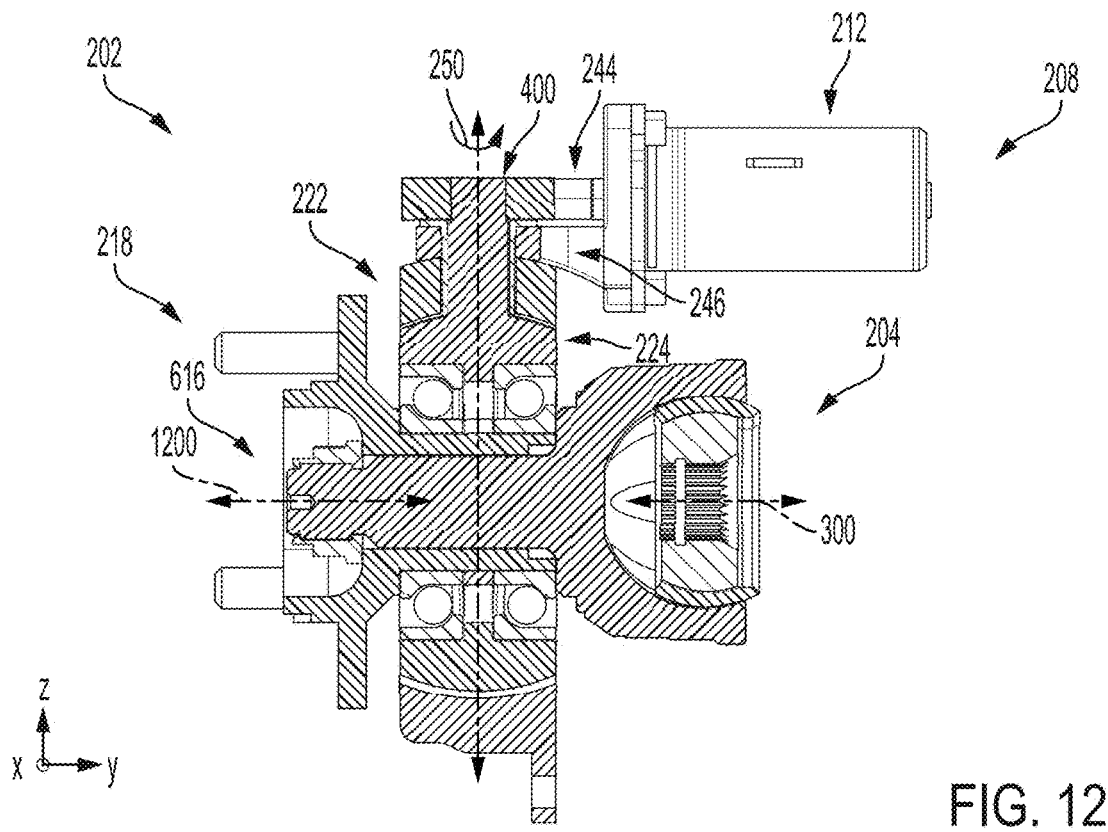

A viewing plane 11-11 corresponding to the cross-sectional view depicted in FIG. 11 is provided in FIG. 10. Further, a viewing plane 12-12 corresponding to the cross-sectional view depicted in FIG. 12 is additionally provided in FIG. 10.

FIG. 11 shows a cross-sectional view of the active wheel carrier system 202. The camber-angle drive 208, the outer race 222, the inner race 224, the roller elements 238, the wheel hub 218, the CV joint 204 with the shaft 616, and the set of bearings 600 are again depicted in FIG. 11. The outer race 222 includes an interior curved surface 1110 that is in contact with the roller elements 238. The inner race 224 also includes an interior curved surface 1112 that is in contact with the roller elements 238.

The CV joint 204 includes balls 1100 captured between an inner race 1104 and an outer race 1102. The shaft 616 extends from the outer race 1102. Further, a surface 1106 (e.g., a curved surface) of the camber-angle worm gear 246 is in face sharing contact with a surface 1108 (e.g., a curved surface) of the outer race 222. The nut 620 that threadingly engages the shaft 616 is again depicted in FIG. 11.

FIG. 11 further shows the motor 212 in the camber-angle drive 208 as well as the worm screw 244 and the camber-angle worm gear 246. The section 404 of the camber-angle worm gear 246 may include a bearing 1114 positioned therein and supporting the worm screw 244.

FIG. 12 shows a cross-sectional view of the active wheel carrier system 202. The wheel hub 218, the CV joint 204, the camber-angle drive 208, the outer race 222, the inner race 224, and the control swivel 400 are again depicted. Further, the motor 212, the worm screw 244, and the camber-angle worm gear 246 in the camber-angle drive 208 are also depicted. FIG. 12 further shows the toe angle 250 for reference. A rotational axis 1200 of the shaft 616 and a rotational axis 300 of the input of the CV joint 204 are provided for reference.

FIGS. 1-12 provide for a method of operation of an active wheel carrier system. The method includes, during vehicle operation, operating a camber-angle drive to alter a camber angle of a wheel independent from a toe angle of the wheel. The method further includes, during vehicle operation, operating a toe-angle drive to alter the toe angle of the wheel independent from the camber angle. It will be understood that vehicle operation includes a condition where the vehicle is in motion. In one example, operating the camber-angle drive may include operating a camber angle actuator to rotate a camber-angle worm screw that is threadingly engaged with a camber-angle worm gear that is coupled to the control swivel. In yet another example, operating the toc-angle drive may include operating a toe angle actuator to rotate a toe-angle worm screw that is threadingly engaged with a toe-angle worm gear that is coupled to the control swivel.

The technical effect of the method of operation of the active wheel carrier system is to increase vehicle handling performance by facilitating independent adjustment of toe angle and camber angle.

The invention will be further described in the following paragraphs. In one aspect, an active wheel carrier system is provided that comprises a constant velocity (CV) joint; a wheel hub coupled to the CV joint and including a set of hub bearings; a hub carrier inner race coupled to the set of bearings; a hub carrier outer race; multiple roller elements interposed between the hub carrier inner race and the hub carrier outer race; a control swivel coupled to the hub carrier inner race; a camber-angle drive configured to independently rotate the hub carrier inner race about a first axis; and a toc-angle drive configured to independently rotate the hub carrier inner race about a second axis that is distinct from the first axis. In one example, the camber-angle drive may be a camber-angle worm drive that includes: a camber-angle worm screw threadingly engaged with a camber-angle worm gear that is coupled to the control swivel; and a camber-angle actuator configured to rotate the camber-angle worm screw. In another example, the toe-angle drive may be a toe-angle worm drive that includes: a toe-angle worm screw threadingly engaged with a toe-angle worm gear that is coupled to the control swivel; and a toe-angle actuator configured to rotate the toe-angle worm screw. In another example, the toe-angle worm gear may be positioned vertically above the camber-angle worm gear. In yet another example, the control swivel may include a shaft that extends through openings in the toc-angle worm gear and the camber-angle worm gear. In another example, the toe-angle actuator and the camber-angle actuator may be electric motors. In another example, the multiple roller elements may be spherical balls. In another example, the CV joint may be configured to receive rotational input from an electric powertrain. In another example, the set of bearings may include an inner ball bearing and an outer ball bearing. In another example, the hub carrier outer race may be configured to attach to a steering knuckle. In another example, rotational axes of the camber-angle worm screw and the toe-angle worm screw may be parallel to one another.

In another aspect, a method for operation of an active wheel carrier system in a vehicle, is provided that comprises during vehicle operation, operating a camber-angle drive to alter a camber angle of a wheel independent from a toe angle of the wheel; and operating a toe-angle drive to alter the toe angle of the wheel independent from the camber angle; wherein the active wheel carrier system includes: a constant velocity (CV) joint; a wheel hub coupled to the CV joint and including a set of hub bearings; a hub carrier inner race; a hub carrier outer race; multiple roller elements interposed between the hub carrier inner race and the hub carrier outer race; a control swivel coupled to the hub carrier inner race; a camber-angle drive configured to independently rotate the hub carrier inner race about a first axis; and a toe-angle drive configured to independently rotate the hub carrier inner race about a second axis that is distinct from the first axis. In one example, operating the camber-angle drive may include operating a camber angle actuator to rotate a camber-angle worm screw that is threadingly engaged with a camber-angle worm gear that is coupled to the control swivel. In another example, the camber angle actuator may be an electric motor. In another example, the hub carrier outer race may be configured to attach to a steering knuckle. In another example, operating the toe-angle drive may include operating a toe angle actuator to rotate a toe-angle worm screw that is threadingly engaged with a toe-angle worm gear that is coupled to the control swivel. In another example, the toe angle actuator may be an electric motor.

In another aspect, an active wheel carrier system in an electric vehicle (EV) is provided that comprises a constant velocity (CV) joint; a wheel hub coupled to the CV joint and including a set of hub bearings; a hub carrier inner race; a hub carrier outer race; multiple roller elements interposed between the hub carrier inner race and the hub carrier outer race; a control swivel that extends through an opening in the hub carrier outer race and is directly coupled to the hub carrier inner race; a camber-angle drive configured to independently rotate the hub carrier inner race about a first axis; and a toe-angle drive configured to independently rotate the hub carrier inner race about a second axis that is distinct from the first axis. In one example, the camber-angle drive may be a camber-angle worm drive that includes: a camber-angle worm screw threadingly engaged with a camber-angle worm gear that is coupled to the control swivel; and a camber-angle actuator configured to rotate the camber-angle worm screw. In another example, the toe-angle drive may be a toe-angle worm drive that includes: a toe-angle worm screw threadingly engaged with a toe-angle worm gear that is coupled to the control swivel; and a toe-angle actuator configured to rotate the toe-angle worm screw. In another example, the multiple roller elements may be spherical balls; and the set of bearings may include an inner ball bearing and an outer ball bearing.

FIGS. 2-12 are drawn approximately to scale, aside from the schematically depicted components. However, the components may have other relative dimensions, in alternate embodiments.

FIGS. 1-12 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example. As described herein, a component that is directly coupled to another component may be referred to as such. Features described as axial may be approximately parallel with an axis referenced unless otherwise specified. Features described as counter-axial may be approximately perpendicular to the axis referenced unless otherwise specified. Features described as radial may be circumferentially around or extend radially outward from an axis, such as the axis referenced, or a component or feature described prior as being radial to a referenced axis, unless otherwise specified.

It will be appreciated that the configurations disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An active wheel carrier system comprising:
   a constant velocity (CV) joint;
   a wheel hub coupled to the CV joint and including a set of hub bearings;
   a hub carrier inner race coupled to the set of bearings;
   a hub carrier outer race;
   multiple roller elements interposed between the hub carrier inner race and the hub carrier outer race;
   a control swivel coupled to the hub carrier inner race;
   a camber-angle drive configured to independently rotate the hub carrier inner race about a first axis; and
   a toe-angle drive configured to independently rotate the hub carrier inner race about a second axis that is distinct from the first axis.

2. The active wheel carrier system of claim 1, wherein the camber-angle drive is a camber-angle worm drive that includes:
   a camber-angle worm screw threadingly engaged with a camber-angle worm gear that is coupled to the control swivel; and
   a camber-angle actuator configured to rotate the camber-angle worm screw.

3. The active wheel carrier system of claim 2, wherein the toe-angle drive is a toe-angle worm drive that includes:
   a toe-angle worm screw threadingly engaged with a toe-angle worm gear that is coupled to the control swivel; and
   a toe-angle actuator configured to rotate the toe-angle worm screw.

4. The active wheel carrier system of claim 3, wherein the toe-angle worm gear is positioned vertically above the camber-angle worm gear.

5. The active wheel carrier system of claim 3, wherein the control swivel includes a shaft that extends through openings in the toe-angle worm gear and the camber-angle worm gear.

6. The active wheel carrier system of claim 3, wherein the toe-angle actuator and the camber-angle actuator are electric motors.

7. The active wheel carrier system of claim 1, wherein the multiple roller elements are spherical balls.

8. The active wheel carrier system of claim 3, wherein rotational axes of the camber-angle worm screw and the toe-angle worm screw are parallel to one another.

9. The active wheel carrier system of claim 1, wherein the set of bearings includes an inner ball bearing and an outer ball bearing.

10. The active wheel carrier system of claim 1, wherein the hub carrier outer race is configured to attach to a steering knuckle.

11. A method for operation of an active wheel carrier system in a vehicle, comprising:
   during vehicle operation, operating a camber-angle drive to alter a camber angle of a wheel independent from a toe angle of the wheel; and
   operating a toe-angle drive to alter the toe angle of the wheel independent from the camber angle;
   wherein the active wheel carrier system includes:
      a constant velocity (CV) joint;
      a wheel hub coupled to the CV joint and including a set of hub bearings;
      a hub carrier inner race;
      a hub carrier outer race;
      multiple roller elements interposed between the hub carrier inner race and the hub carrier outer race;
      a control swivel coupled to the hub carrier inner race;
      the camber-angle drive configured to independently rotate the hub carrier inner race about a first axis; and
      the toe-angle drive configured to independently rotate the hub carrier inner race about a second axis that is distinct from the first axis.

12. The method of claim 11, wherein operating the camber-angle drive includes operating a camber angle actuator to rotate a camber-angle worm screw that is threadingly engaged with a camber-angle worm gear that is coupled to the control swivel.

13. The method of claim 12, wherein the camber angle actuator is an electric motor.

14. The method of claim 13, wherein the hub carrier outer race is configured to attach to a steering knuckle.

15. The method of claim 11, wherein operating the toe-angle drive includes operating a toe angle actuator to rotate a toe-angle worm screw that is threadingly engaged with a toe-angle worm gear that is coupled to the control swivel.

16. The method of claim 15, wherein the toe angle actuator is an electric motor.

17. An active wheel carrier system in an electric vehicle (EV), comprising:
   a constant velocity (CV) joint;

a wheel hub coupled to the CV joint and including a set of hub bearings;

a hub carrier inner race;

a hub carrier outer race;

multiple roller elements interposed between the hub carrier inner race and the hub carrier outer race;

a control swivel that extends through an opening in the hub carrier outer race and is directly coupled to the hub carrier inner race;

a camber-angle drive configured to independently rotate the hub carrier inner race about a first axis; and a toe-angle drive configured to independently rotate the hub carrier inner race about a second axis that is distinct from the first axis.

18. The active wheel carrier system of claim 17, wherein the camber-angle drive is a camber-angle worm drive that includes:

a camber-angle worm screw threadingly engaged with a camber-angle worm gear that is coupled to the control swivel; and a camber-angle actuator configured to rotate the camber-angle worm screw.

19. The active wheel carrier system of claim 17, wherein the toe-angle drive is a toe-angle worm drive that includes:

a toe-angle worm screw threadingly engaged with a toe-angle worm gear that is coupled to the control swivel; and a toe-angle actuator configured to rotate the toe-angle worm screw.

20. The active wheel carrier system of claim 17, wherein:

the multiple roller elements are spherical balls; and the set of bearings includes an inner ball bearing and an outer ball bearing.

* * * * *